US00RE36724E

United States Patent [19]

Westerberg et al.

[11] E Patent Number: Re. 36,724

[45] Reissued Date of Patent: Jun. 6, 2000

[54] VISIBLE LIGHT AND INFRA-RED COOKING APPARATUS

[75] Inventors: Eugene R. Westerberg, Palo Alto; Robert I. Beaver, II, Atherton, both of Calif.

[73] Assignee: Quadlux, Inc., Fremont, Calif.

[21] Appl. No.: 09/074,141

[22] Filed: May 7, 1998

Related U.S. Patent Documents

Reissue of:

[64] Patent No.: 5,517,005
Issued: May 14, 1996
Appl. No.: 08/481,153
Filed: Jun. 7, 1995

U.S. Applications:

[63] Continuation of application No. 08/334,697, Nov. 7, 1994, abandoned, which is a continuation of application No. 07/664,494, Mar. 5, 1991, abandoned, which is a continuation of application No. 07/195,967, May 19, 1988, abandoned.

[51] Int. Cl.[7] ..... H05B 6/80; H05B 3/68

[52] U.S. Cl. ..... 219/685; 219/719; 219/405; 219/462.1; 219/464.1; 392/416; 392/418; 392/433; 99/451

[58] Field of Search ..... 219/685, 718, 219/719, 405, 458, 461, 464, 339, 342, 352, 354, 461.1, 462.1, 464.1; 392/416, 417, 418, 422, 434; 99/DIG. 14, 451, 325

[56] References Cited

U.S. PATENT DOCUMENTS

| | | | |
|---|---|---|---|
| 2,559,249 | 7/1951 | Hudson | 35/219 |
| 2,824,943 | 2/1958 | Lauglin | 35/215 |
| 2,864,932 | 12/1958 | Forrer | 219/35 |
| 2,980,544 | 4/1961 | Mills | 99/229 |
| 3,003,409 | 10/1961 | Mills | 99/331 |
| 3,037,443 | 6/1962 | Newkirk et al. | 99/332 |
| 3,131,280 | 4/1964 | Brussel | 219/411 |
| 3,249,741 | 5/1966 | Mills | 219/388 |
| 3,304,406 | 2/1967 | King | 219/411 |
| 3,313,917 | 4/1967 | Ditzler et al. | 219/400 |
| 3,414,709 | 12/1968 | Tricault | 219/411 |

(List continued on next page.)

FOREIGN PATENT DOCUMENTS

| | | |
|---|---|---|
| 0215617 | 9/1986 | European Pat. Off. . |
| 2546106 | 4/1977 | Germany . |
| 3503648 | 4/1986 | Germany . |
| 34 42 804 A1 | 6/1986 | Germany . |
| 52-112146 | 9/1977 | Japan . |
| 57-60007 | 4/1982 | Japan . |
| 57-70323 | 4/1982 | Japan . |
| 59-1930 | 1/1984 | Japan . |
| 59-47302 | 3/1984 | Japan . |
| 59-210228 | 11/1984 | Japan . |
| 60-69920 | 5/1985 | Japan . |
| 60-167932 | 11/1985 | Japan . |
| 60-245933 | 12/1985 | Japan . |

(List continued on next page.)

OTHER PUBLICATIONS

Fostoria Corporation, "Heat Processing with Infrared", Feb. 1962, pp 1–7.

Summer, W. Dr., "Ultra–Violet and Infra–Red Engineering" 1962, pp 102–112.

Beggs, E. W., "Quicker Drying with Lamps", Jul. 1939, vol. 97, No. 7, pp 88–89.

Harold McGee, Book, "On Food and Cooling", Chapter 14, pp. 608–624.

*Primary Examiner*—Philip H. Leung
*Attorney, Agent, or Firm*—Limbach & Limbach LLP

[57] ABSTRACT

An oven using one or more quartz tungsten light bulbs capable of producing 1.5 kW of radiant energy of which a significant portion is light energy in the 0.4 to 0.7 $\mu$m wavelength range impinges high intensity visible light wave radiation directly onto a food item. Light sources can be positioned above and below the food item and the inner walls of the oven are preferably highly reflective to reflect light energy onto the food. The intensity of the visible light source is automatically controllable and can be varied throughout the cooking cycle.

32 Claims, 2 Drawing Sheets

U.S. PATENT DOCUMENTS

| | | | |
|---|---|---|---|
| 3,448,678 | 6/1969 | Burstein | 99/386 |
| 3,559,564 | 2/1971 | Turner et al. | 99/332 |
| 3,569,656 | 3/1971 | White et al. | 219/718 |
| 3,586,823 | 6/1971 | Schier | 219/347 |
| 3,601,582 | 8/1971 | Boisfleury | 219/388 |
| 3,626,154 | 12/1971 | Reed | 219/411 |
| 3,626,155 | 12/1971 | Joeckel | 219/411 |
| 3,648,010 | 3/1972 | Schier | 219/214 |
| 3,682,643 | 8/1972 | Foster | 219/405 |
| 3,713,846 | 1/1973 | Turner et al. | 99/217 |
| 3,719,789 | 3/1973 | Harnden, Jr. | 219/10.49 |
| 3,828,163 | 8/1974 | Amagami et al. | 219/413 |
| 3,836,751 | 9/1974 | Anderson | 219/411 |
| 3,847,069 | 11/1974 | Guibert | 219/388 |
| 3,935,807 | 2/1976 | Main | 99/352 |
| 3,944,807 | 3/1976 | Frantti et al. | 240/11.2 R |
| 3,959,620 | 5/1976 | Stephen, Jr. | 219/386 |
| 4,101,759 | 7/1978 | Anthony | 219/405 |
| 4,164,643 | 8/1979 | Peart et al. | 219/411 |
| 4,191,881 | 3/1980 | Ahlgren et al. | 219/388 |
| 4,238,995 | 12/1980 | Polster | 99/331 |
| 4,244,284 | 1/1981 | Flavan et al. | 99/327 |
| 4,245,148 | 1/1981 | Gisske et al. | 219/492 |
| 4,276,465 | 6/1981 | Flavio | 219/388 |
| 4,363,957 | 12/1982 | Tachikawa et al. | 219/497 |
| 4,367,388 | 1/1983 | Ishihara et al. | 219/10.55 B |
| 4,374,319 | 2/1983 | Guibert | 219/405 |
| 4,410,779 | 10/1983 | Weiss | 219/685 |
| 4,421,015 | 12/1983 | Masters et al. | 99/400 |
| 4,441,015 | 4/1984 | Eichelberger et al. | 219/411 |
| 4,455,479 | 6/1984 | Itoh | 219/405 |
| 4,463,238 | 7/1984 | Tanabe | 219/685 |
| 4,468,260 | 8/1984 | Hiramoto | 219/411 |
| 4,481,405 | 11/1984 | Malick | 219/405 |
| 4,486,639 | 12/1984 | Mittelsteadt | 219/685 |
| 4,493,960 | 1/1985 | Mittelsteadt et al. | 219/10.55 B |
| 4,506,652 | 3/1985 | Baker | 219/388 |
| 4,508,960 | 4/1985 | Arai | 219/388 |
| 4,511,788 | 4/1985 | Arai et al. | 219/405 |
| 4,516,486 | 5/1985 | Burkhart | 99/388 |
| 4,554,437 | 11/1985 | Wagner et al. | 219/388 |
| 4,561,907 | 12/1985 | Raicu | 148/187 |
| 4,565,704 | 1/1986 | Dagerskog | 426/233 |
| 4,575,616 | 3/1986 | Bergendal | 219/405 |
| 4,598,194 | 7/1986 | Halberstadt et al. | 219/464 |
| 4,687,895 | 8/1987 | Chitre et al. | 219/685 |
| 4,700,051 | 10/1987 | Goessler et al. | 219/464 |
| 4,731,251 | 3/1988 | Jovanovic | 219/405 |
| 4,761,529 | 8/1988 | Tsisios | 219/685 |
| 4,808,798 | 2/1989 | Goessler et al. | 219/464 |
| 4,836,138 | 6/1989 | Robinson et al. | 118/666 |
| 4,871,559 | 10/1989 | Dunn et al. | 426/248 |
| 4,910,942 | 3/1990 | Dunn et al. | 53/425 |
| 4,960,977 | 10/1990 | Alden | 219/388 |
| 4,999,468 | 3/1991 | Fadel | 219/10.55 A |
| 5,036,179 | 7/1991 | Westerberg et al. | 219/411 |
| 5,038,395 | 8/1991 | Lenski | 392/420 |
| 5,039,535 | 8/1991 | Lang et al. | 426/233 |
| 5,108,792 | 4/1992 | Anderson et al. | 118/725 |

FOREIGN PATENT DOCUMENTS

| | | |
|---|---|---|
| 63-34913 | 3/1988 | Japan . |
| 63-46720 | 3/1988 | Japan . |
| 63-49405 | 4/1988 | Japan . |
| 1-154483 | 6/1989 | Japan . |
| 2-89921 | 3/1990 | Japan . |
| 85-9996 | 12/1985 | Rep. of Korea . |
| 1155223 | 5/1985 | U.S.S.R. . |
| 1215651 | 3/1986 | U.S.S.R. . |
| 1273023 | 5/1972 | United Kingdom . |
| 2132060 | 8/1983 | United Kingdom . |
| 2147788 | 5/1985 | United Kingdom . |
| 2152790 | 8/1985 | United Kingdom . |
| 2180637 | 4/1987 | United Kingdom . |
| 8803369 | 5/1988 | WIPO . |
| 9410857 | 5/1994 | WIPO . |

VISIBLE LIGHT AND INFRA-RED COOKING APPARATUS

Matter enclosed in heavy brackets [ ] appears in the original patent but forms no part of this reissue specification; matter printed in italics indicates the additions made by reissue.

This is a continuation of application Ser. No. 08/334,697 filed on Nov. 7, 1994, now abandoned, which was a continuation of Ser. No. 07/664,494, filed on Mar. 5, 1991, now abandoned, which was a continuation of Ser. No. 07/195,967 filed on May 19, 1988, now abandoned.

FIELD OF THE INVENTION

This invention relates to the field of cooking apparatus. More particularly, this invention relates to baking and cooking processes that are substantially faster than such processes in conventional ovens, and offer sensory improvements in quality for many foodstuffs.

BACKGROUND OF THE INVENTION

Ovens for cooking food have been known and used for thousands of years. Basically, oven types can be categorized in four different forms. The simplest and probably the oldest cooking resulted when man put some vegetable or grain products on a hot rock next to a fire, and cooked them essentially by the heat transfer method of conduction. With a little more refinement, an enclosure surrounding the heating element entrapped the heated air giving rise to cooking by convective heat transfer. This was the prototype for the modern gas or electric oven. In the past century, radiant energy from infra-red radiation sources has been used to heat and cook foodstuffs directly. Within the past few decades, microwave radiation has proved useful in allowing very short cooking times for many types of food.

It has generally been believed that radiation with wavelengths much shorter than 1 $\mu$m is not of much value in cooking or baking processes, partly because of the weaker interaction of the shorter wavelengths with the foodstuff molecules in terms of general heat transfer, and partly due to the inferior penetrating properties of such radiation. In particular, it has seemed that visible light, i.e., radiation with a wavelength in the range of 0.4 to 0.7 $\mu$m, is not very useful in the cooking process. However, if one provides a sufficiently intense source of visible light radiation in conjunction with infra-red radiation, a novel and very effective cooking apparatus results. The combination of the deeply penetrating infra-red and the intense visible radiations establishes a temperature gradient within the interior of the foodstuff. This strong gradient created by the differential absorbtion of the infra-red and visible radiations ensures that the surface temperature of the foodstuff is hotter than the interior, and the products of the cooking, i.e., the water vapor and gases like $CO_2$, are quickly driven to the surface and out of the foodstuff. This process results in a very rapid cooking of the foodstuff.

Using intense visible and infra-red radiation to cook food has a number of significant advantages. First of all, the cooking process is very fast. Bakery products, like pizza crust for example, can be baked 5 to 10 times faster than ovens that use only infra-red energy or rely on conventional convection and conduction processes. Secondly, the quality of the cooking process is enhanced for many foodstuffs. For example, crusts become fully cooked with crispy exteriors and moist, chewy interiors. Vegetables are cooked so fast that they are virtually steamed in their own water vapor, leaving them hot, but with very little loss of any of their nutritive values.

In general, this is a new mode of cooking. The potentialities of using this enhanced range of wavelengths for cooking and baking are just starting to be explored, and a whole new range of cooking techniques should result from the invention.

SUMMARY OF THE INVENTION

An oven is disclosed for the high-speed, high-quality cooking of food items. The oven includes a means for impinging high-intensity visible and infrared radiations onto a food item, thereby cooking the item at an accelerated rate over the use of infra-red cooking alone. This cooking process can be aided by conduction. Ordinarily, the radiation impinging means is one or more quartz halogen tungsten lamps, or equivalent means such as quartz arc lamps. Typical quartz-halogen lamps of this type convert electrical energy into black body radiation having a range of wavelengths from 0.4 $\mu$m to 45 $\mu$m with a peak intensity at approximately 1 $\mu$m. *Such lamps produce approximately 7% of their radiant energy in the visible range of 0.4 to 0.7 $\mu$m at peak intensity.* Each lamp provides about 1.5 kW of radiant energy with a significant portion of the energy in the visible light spectrum. Typical configurations can use one to as many as ten lamps operated in unison, and larger ovens could use even more lamps.

One or more of the radiation source lamps may be used in the cooking process as necessary. These radiation sources are ordinarily positioned above and below the food item. Certain applications may require that radiation sources surround the food item. The walls of the surrounding food chamber are preferably treated to be highly reflective. The visible and infrared waves from the radiation sources impinge directly on the food item and are also reflected on this inner surface of the oven to strike the food item many times and from many angles. This reflecting action results in a greater uniformity of cooking, and since very little of the radiation is absorbed in the surrounding reflecting surface, almost all of the radiant energy is converted into heat upon and within the foodstuff. Hence, this process is a very efficient mode of transferring energy to the foodstuff for cooking, and operation is very economical.

For certain cooking applications, the food item may be placed on a radiant energy absorbing and heat conductive support platter. Such platter can be selectively heated by means of the bottom set of lamps to increase its temperature to a point where it can aid the cooking process by conductive heating, if desired. The platter may be perforated in such a manner so as to facilitate the removal of internal water vapor and gases from the bottom of the foodstuff.

The intensity of the radiation from the lamps is controllable. Each lamp can be individually controlled or the lamps can be operated in unison to provide the desired cooking result. It is necessary that this control be performed quickly, because of the inherent speed of the cooking process. For certain food products, it is necessary that the intensity be varied throughout the cooking cycle. Such fast and variable intensity control is preferably managed through automatic means, such as computer or microprocessor circuits.

DETAILED DESCRIPTION OF THE PREFERRED EMBODIMENT

Figure 1:
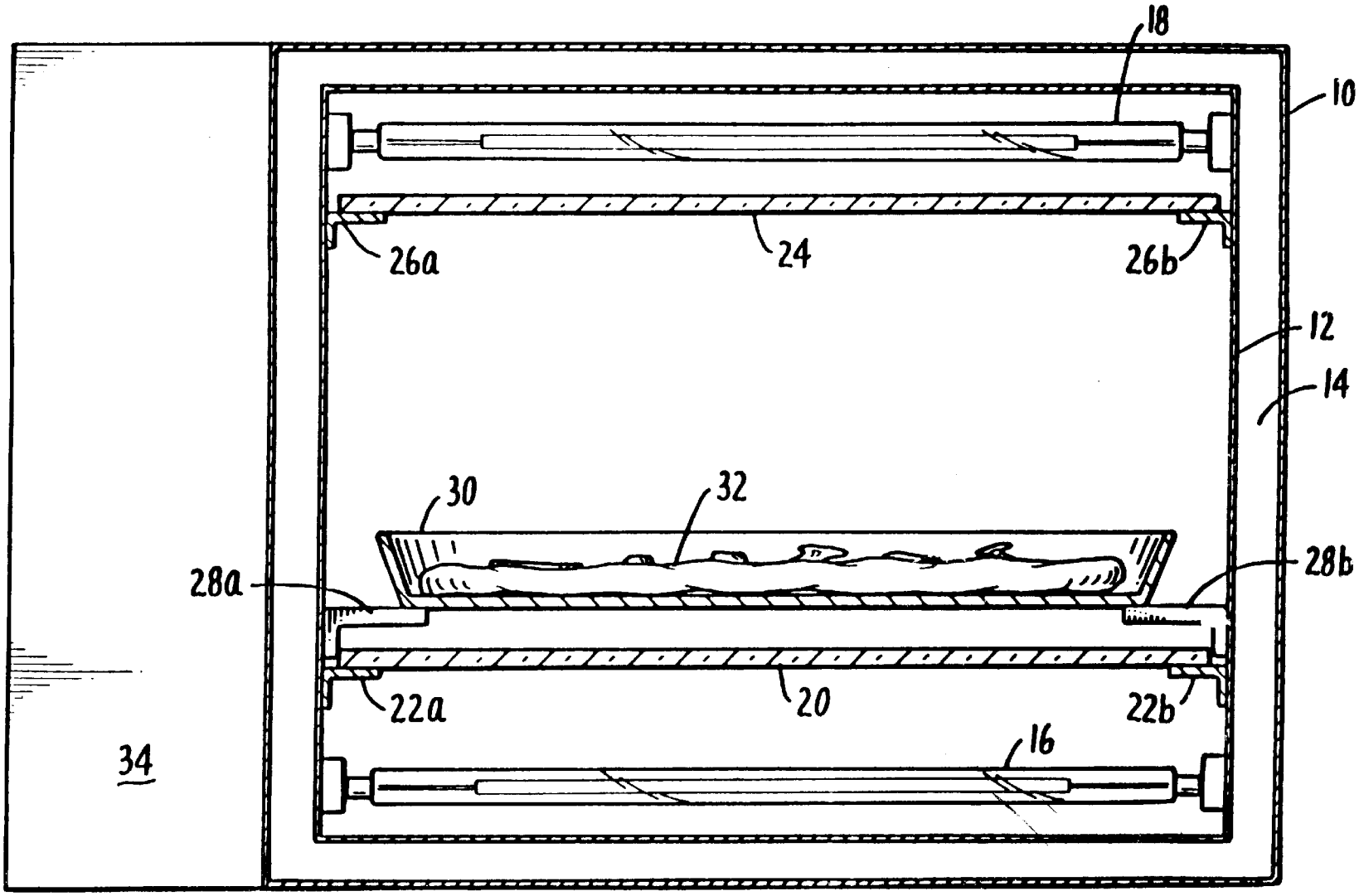
FIG. 1 is a front cross section of a preferred embodiment of the present invention.

FIG. 1 is a front cross section of the preferred embodiment of the present invention. The oven in FIG. 1 includes an outer enclosure 10. The enclosure has an inner wall 12 coupled to the outer wall 10. Ordinarily, an insulating layer 14 is formed between the outer enclosure 10 and the inner wall 12. Because of the inherent speed of the cooking cycle, the insulating layer 14 may be a layer of air.

The energy for cooking is supplied by the lower radiation heating lamps 16 and the upper radiation heating lamps 18. These lamps are generally any of the quartz body, tungsten-halogen lamps commercially available, e.g., 1.5 KW 208 V quartz-halogen lamps. The oven according to the preferred embodiment utilizes ten such lamps and cooks with an average of 10% of the energy in the visible light portion of the spectrum, which is significant. The inner surface of the inner wall 12 is preferably a highly polished, poorly absorptive surface, so that it appears to be very reflective to the wide spectrum of wavelengths from the radiant lamps. Two radiation transparent plates 20 and 24 are used to isolate the cooking chamber from the radiant sources. These plates can be formed from such materials as quartz or a glass that transmits both visible and infra-red radiations. The lower transparent plate 20 is supported by brackets 22a and 22b and is positioned above the lower lamps 16. The upper transparent plate 24 is supported by brackets 26a and 26b and is positioned below upper lamps 18.

Brackets 28a and 28b support platter 30. The platter 30 is positioned above the lower transparent plate 20 and below the upper glass plate 24. A food item 32 is positioned on platter 30 to be cooked. The control circuit 34, shown as a circuit block, controls the operation of lamps 16 and 18.

The lamps 16 and 18 produce very high intensity visible and infra-red radiations. Prior art use of radiant energy heat sources teach cooking using radiation in the infra-red portion of the electro-magnetic spectrum. For example, see Malick U.S. Pat. Nos. 4,481,405 and Bassett 4,486,639. Burkhart, in 4,516,486, discloses a radiant energy cooker for the exclusive purpose of charring the surface of foods, particularly meats.

The use of both high intensity visible and infrared radiations provides a very rapid method of high-quality cooking and baking. The radiant energy from the lamps 16 and 18 radiates from the bulb in all directions. A portion of the energy radiates directly onto the food item 32. The remainder of the energy will be reflected off the polished surface of the preferably metal inner wall 12 and strike the food item 32 for more efficient cooking.

The platter 30 may be formed of a material similar to the transparent plates 20 and 24 to allow even cooking of food item 32. However, in some circumstances it may be desirable to crisp the bottom of the food item 32. As a particular example, when cooking a pizza, it is desirable that the crust be light and crispy, rather than soggy and doughy. In such an application, the cooking platter 30 should be formed of a radiation absorbing, heat conducting material, such as black anodized aluminum. In this way, the lower lights 16 would rapidly heat the platter 30 to a high temperature in order to crisp the bottom of the pizza. It may also be desirable to perforate the platter 30 in order to allow steam to escape from the cooking pizza dough. The platter 30 should touch the support brackets 28a and 28b over very limited areas, so that the heat delivered to platter 30 is not lost by conduction.

It is possible to control the lights 16 and 18 independently with the control circuit 34. The control circuit 34, shown as a circuit block in FIG. 1, may include a microprocessor or a microcontroller and associated memory to store individual cooking recipes to control proper heating of the food product.

For example, in cooking a pizza, it may be desirable to run the upper lamps 18 at a reduced power level for a time. For a pizza having fresh vegetables, this would prevent the overcooking of the vegetables making them mushy. The lower lamps 16 might be operated at a higher power level to make the pizza crust light and crispy.

Figure 2:
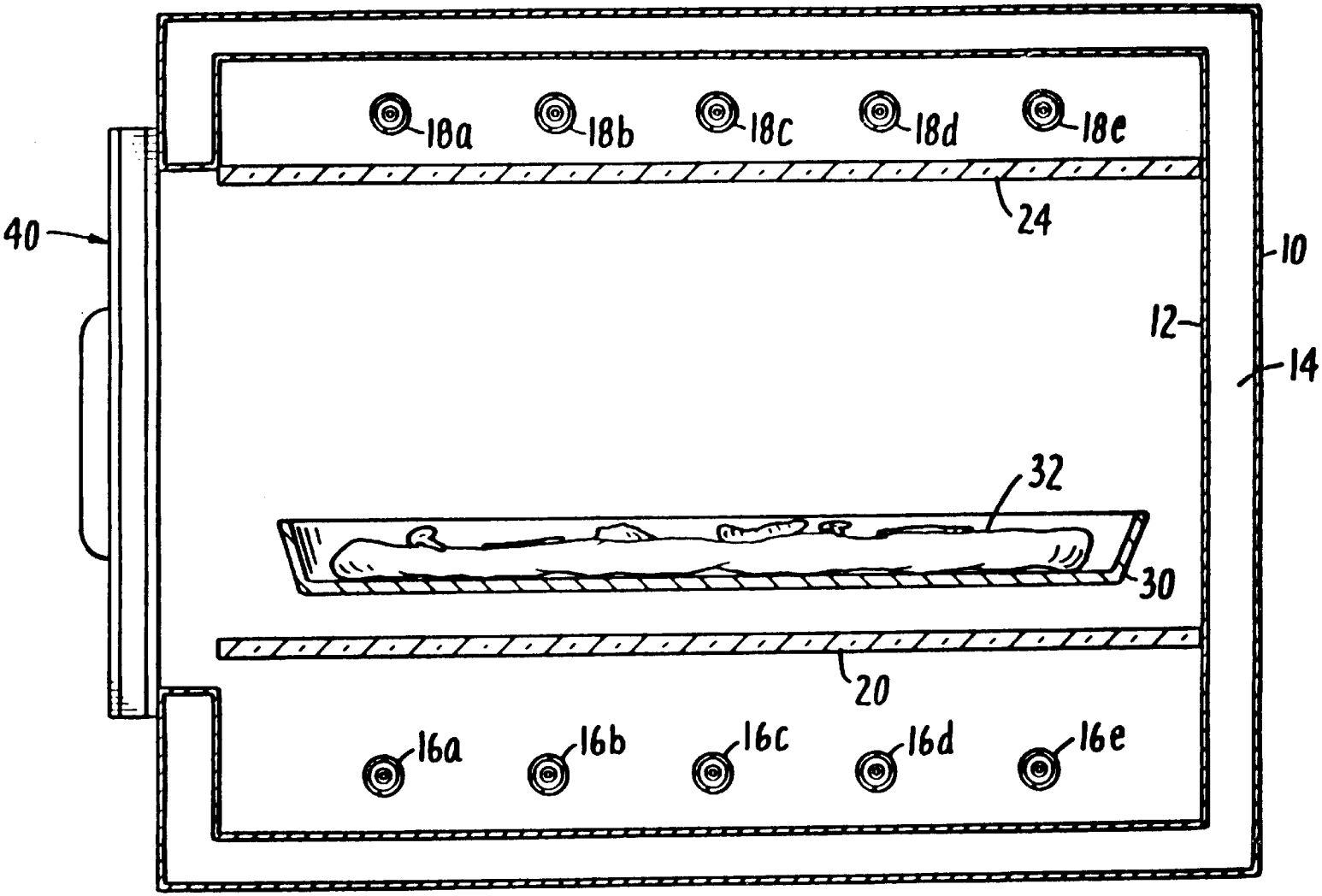
FIG. 2 shows a side cross section of the preferred embodiment of the present invention.

FIG. 2 shows a side cross section of the preferred embodiment of the present invention. In the preferred embodiment, there are 5 lower lamps 16a through 16e and 5 upper lamps 18a though 18e. By appropriately selecting the lateral spacing between the lamps relative to the food, even cooking can be achieved over the entire surface. A door 40 is also shown.

Microwave ovens cannot be used in cooking high quality freshly prepared pizza. The commercially available frozen pizzas for microwave ovens are precooked and then frozen. The pizza is merely heated to the proper serving temperature in the microwave oven, but the result is usually tough and soggy. A higher quality pizza can be baked in a commercial grade conduction/convection oven. Here, the pizza is placed directly on the hot floor of the oven to properly crisp the bottom of the crust (up to 900° F. in a brick oven). Unfortunately, the ovens have various "hot" spots and require constant operator attention to avoid over or under cooking the pizza, i.e., consistency is a major problem. The ovens cook a pizza in 5 to 20 minutes. Conveyorized infra-red and hot air convection ovens can cook a pizza in 5 to 15 minutes, but have great difficulty in properly crisping the bottom of the pizza. A pizza can be cooked in the present invention in 35 to 45 seconds. This speed is very important in the commercial pizza market because it enables pizza to be produced in a manner that would qualify it as a true fast-food.

The energy efficiency of the present invention is illustrated by the fact that the energy cost to cook such a pizza is about $0.01. The majority of the radiant energy produced by the oven is utilized in cooking the pizza and after the cooking process is completed the energy is turned off. In contrast, conventional commercial pizza ovens must be preheated to desired cooking temperatures. Ordinarily, the oven pizza restaurant is left on all day, whether cooking a pizza or not, making the energy consumption significant.

The oven of the present invention is not limited to cooking pizzas. Certain foods are cooked with more consistent and reliable results than with conventional techniques. For example, cooking vegetables, such as broccoli, so that they retain good texture is difficult using prior art techniques. Generally, such items are preferred al dente. The short cooking times of the present invention, about 20 seconds for broccoli, bring the product to serving temperature so rapidly that the vegetable maintains its crisp, firm texture.

The oven of the present invention may also be used cooperatively with other cooking sources. For example, the oven of the present invention may include a microwave radiation source. Such an oven would be ideal for cooking a thick food item such as a roast beef. The microwave radiation would be used to cook the interior portions of the meat and the infra-red and visible light radiation of the present invention would cook the outer portions. Further, the oven according to the present invention could be used with a convection oven or with both convention oven and microwave oven cooking sources.

The present invention was described in relation to a preferred embodiment. However, it will be apparent to one skilled in the art that one can change the parameters and still practice an invention within the spirit and scope of the present invention.

What is claimed is:

1. An oven for cooking and baking food comprising:

a. a cooking chamber having highly reflective and poorly absorptive inner wall for reflecting radiant energy to a food position centrally thereof;

b. a plurality of means for generating radiant energy having a significant portion of energy in the visible light range of the electromagnetic spectrum, said means for generating positioned inside said cooking chamber and including at least one source positioned above and at least one source positioned below said food position for impinging at least a portion of said radiant energy directly from said radiant energy generating means on said food and reflecting from said inner wall radiant energy not impinging directly on said food for impinging reflected radiant energy from said radiant energy generating means to said food many times from many angles; and c. a support member which is transparent to said radiant energy for supporting the food at said food position while cooking.

2. The oven according to claim 1 further comprising means for differentially controlling each of said plurality of sources by time and by intensity.

3. The oven according to claim 1 further comprising a microwave radiation source.

4. The oven according to claim 1 further comprising a convection oven cooking apparatus.

5. The oven according to claim 4 further comprising a microwave radiation source.

6. The oven according to claim 1 wherein said means for generating radiant energy comprises quartz body tungsten lamps.

7. The oven according to claim 6 further comprising a plurality of radiant energy transparent plates positioned in said chamber between said food position and said lamps.

8. An oven for cooking and baking food comprising:

a. a cooking chamber having reflective inner walls for reflecting radiant energy to a food position centrally thereof;

b. five 1.5 KW quartz-halogen lamps positioned inside said cooking chamber above said food position and five 1.5 KW quartz-halogen lamps positioned inside said cooking chamber below said food position generating at least 6 KW of radiant power with a significant portion of radiant energy in the visible light range of the electromagnetic spectrum, said lamps positioned in said chamber for impinging direct and reflected radiant energy on said food; and c. a support member which is transparent to said radiant energy for holding the food at said food position while cooking.

9. A pizza oven for cooking and baking a raw pizza pie and forming a cooked pizza therefrom, said pizza having a crust formed of dough and toppings formed of any variety of foodstuffs comprising:

a. a cooking chamber having reflective inner walls for reflecting radiant energy to a pizza location centrally thereof;

b. a plurality of 1.5 KW quartz halogen lamps generating at least 6 KW of radiant power with a significant portion of radiant energy in the electromagnetic spectrum having wavelengths in the range of visible light, said lamps having a first group of lamps inside said cooking chamber positioned above said pizza location and a second group of lamps inside said cooking chamber positioned below said pizza location for impinging at least a portion of said radiant energy directly onto said pizza;

c. a plurality of plates which are transparent to radiant energy positioned between said pizza location and said lamps; and d. means for controlling the first group of lamps and the second group of lamps independently by time and intensity.

10. A pizza oven for cooking and baking a raw pizza pie and forming a cooked pizza therefrom, said pizza having a crust formed of dough and toppings formed of any variety of foodstuffs comprising:

a. a cooking chamber having reflective inner walls for reflecting radiant energy to a pizza location centrally thereof;

b. a plurality of 1.5 KW quartz halogen lamps generating at least 6 KW of radiant power with a significant portion of radiant energy in the electromagnetic spectrum having wavelengths in the range of visible light, said lamps having a first group of five lamps inside said cooking chamber positioned above said pizza location and a second group of five lamps inside said cooking chamber positioned below said pizza location for impinging at least a portion of said radiant energy directly onto said pizza;

c. a plurality of plates which are transparent to radiant energy positioned between said pizza location and said lamps; and d. means for controlling the first group of lamps and the second group of lamps independently by time and intensity.

11. A method of cooking and baking a raw pizza pie in a cooking chamber having reflective inner walls comprising the steps of:

a. generating at least 6 KW of radiant power having substantially ten percent of the radiant energy in the electromagnetic spectrum having a wavelength in the order of 0.4 $\mu$m to 0.7 $\mu$m by using a plurality of quartz body tungsten lamps, said lamps having a first group of lamps inside said cooking chamber positioned above said pizza and a second group of lamps inside said cooking chamber positioned below said pizza for impinging at least a portion of said radiant energy directly onto said pizza;

b. positioning a plurality of plates which are transparent to radiant energy between said pizza and said lamps; and c. controlling the first group of lamps and the second group of lamps differentially by time and intensity.

12. An oven for cooking a food item having a first temperature, wherein said oven comprises:

a. a cooking chamber having reflective inner walls for reflecting radiant energy to a food position therein;

b. means mounted in said cooking chamber generating at least 6 KW of radiant power with a substantial portion of radiant energy in the electromagnetic spectrum having a range of wavelengths from 0.4 $\mu$m to 4.5 $\mu$m with a peak intensity at approximately 1.0 $\mu$m and including a significant portion having wavelengths in the range of 0.4 to 0.7 $\mu$m for impinging at least a portion of said energy from said generating means directly on the food and for impinging reflected energy from said generating means on the food; and c. a support member which is transparent to said radiant energy for supporting the food at said food position.

13. The oven of claim 12 wherein said portion of radiant energy in said spectrum is substantially ten percent.

14. An oven for cooking a food item having a first temperature, wherein said oven comprises:

a. quartz body tungsten-halogen lamp means generating at least 6 KW of radiant power with radiant energy only, said radiant energy having a range of wavelengths from 0.4 to 4.5 $\mu$m with a peak intensity at approximately 1.0 $\mu$m and including a significant portion having a significant portion of radiant energy in the electromagnetic spectrum having wavelengths in the range of 0.4 $\mu$m to 0.7 $\mu$m;

b. an enclosure surrounding said lamp means, said enclosure having an outer surface and an inner surface, said inner surface being reflective of said radiant energy to a food position centrally of said inner surface and c. means for mounting said lamps in said enclosure whereby portions of said energy will impinge directly on at least opposite sides of the food in order to bring the food to a specified second temperature, said second temperature being higher than said first temperature.

15. A method of cooking a food item having a first temperature, comprising the steps of:

a. generating at different positions for impingement on opposite sides of food a significant portion of radiant energy in the electromagnetic spectrum having wavelengths in the range of visible light;

b. directing a first portion of said energy to impinge directly on opposite sides of the food in a food position in order to bring the food to a specified second temperature, said second temperature being higher than said first temperature; and c. reflecting a second portion of said energy to the food position to strike the food many times from many angles.

16. A method of cooking a food item having a first temperature, comprising the steps of:

a. generating at least 6 KW of radiant power having a substantially 10% portion of radiant energy in the electromagnetic spectrum having wavelengths in the range of visible light;

b. directing a first portion of said energy to impinge directly on the food in a food position in order to bring the food to a specified second temperature, said second temperature being higher than said first temperature; and c. reflecting a second portion of said energy to the food position.

17. A method of cooking and baking a raw pizza pie and forming a cooked pizza therefrom, said pizza having a crust formed of dough and toppings formed of any variety of foodstuffs comprising:

a. generating radiant power of at least 6 KW having radiant energy in the electromagnetic spectrum having approximately 10% of its wavelengths in the range of visible light by energizing lamps positioned above and below the pizza;

b. directing energy to impinge directly on the pizza; and c. controlling the lamps independently by time and intensity.

18. An oven for cooking a food item having a first temperature, wherein said oven comprises:

a. a first group of quartz body tungsten halogen lamps and a second group of quartz body tungsten halogen lamps, each group including five lamps, said lamps generating at least 6 KW of radiant power and generating a significant portion of radiant energy in the electromagnetic spectrum having a wavelength in the range of 0.4 $\mu$m to 0.7 $\mu$m; and b. an enclosure surrounding said lamps, the enclosure having an outer surface and an inner surface, said inner surface being reflective of said radiant energy to a food position within said inner surface and c. means for mounting said lamps in said enclosure whereby portions of said energy will impinge directly on at least opposite sides of the food in order to bring the food to a specified second temperature, said second temperature being higher than said first temperature.

19. An oven for cooking and baking food comprising:

a. a cooking chamber having reflective inner walls for reflecting radiant energy to a food position centrally thereof;

b. at least five quartz body tungsten lamps positioned inside said cooking chamber above said food position and at least five quartz body tungsten lamps positioned inside said cooking chamber below said food position, said lamps generating at least 6 KW of radiant power and generating radiant energy having a significant portion of energy in the visible light range of the electromagnetic spectrum, said lamps positioned for impinging at least portions of said radiant energy directly on said food; and c. a container which is transparent to said radiant energy for holding the food at said food position while cooking.

20. A pizza oven for cooking and baking a raw pizza pie and forming a cooked pizza therefrom, said pizza having a crust formed of dough and toppings formed of any variety of foodstuffs comprising:

a. a cooking chamber having reflective inner walls for reflecting radiant energy to a pizza location centrally thereof;

b. a plurality of quartz body halogen lamps for generating a significant portion of radiant energy in the electromagnetic spectrum having wavelengths in the range of visible light, said lamps having a first group of five lamps inside said cooking chamber positioned above said pizza location and a second group of five lamps inside said cooking chamber positioned below said pizza location, said lamps generating at least 6 KW of radiant power for impinging at least a potion of said radiant energy directly onto said pizza;

c. a plurality of plates which are transparent to radiant energy positioned between said pizza location and said lamps; and d. means for controlling the first group of lamps and the second group of lamps independently by time and intensity.

*21. The oven according to claim 1 wherein said means for generating radiant energy generates energy in the electromagnetic spectrum having a range of wavelengths from 0.4 $\mu$m to 4.5 $\mu$m with a peak intensity at approximately 1.0 $\mu$m.*

*22. The oven according to claim 1 wherein said significant portion of energy in the visible light range is approximately seven percent.*

*23. The oven according to claim 1 wherein said significant portion of energy in the visible light range is approximately seven percent and higher.*

*24. The method of claim 15 wherein said energy in the electromagnetic spectrum has a range of wavelengths from 0.4 μm to 4.5 μm with a peak intensity at approximately 1.0 μm.*

*25. The method of claim 15 wherein said significant portion of energy in the range of visible light is approximately seven percent.*

*26. The method of claim 15 wherein said significant portion of energy in the range of visible light is approximately seven percent and higher.*

*27. An oven for cooking and baking food comprising:*

*a. a cooking chamber having a highly reflective and poorly absorptive inner wall for reflecting radiant energy to a food position centrally thereof;*

*b. a plurality of means for generating radiant energy having energy in the infrared range and in the visible light range of the electromagnetic spectrum and wherein said means for generating radiant energy generates energy in the electromagnetic spectrum having a range of wavelengths from 0.4 μm to 4.5 μm with a peak intensity at approximately 1.0 μm, said means for generating positioned inside said cooking chamber and including at least one source positioned above and at least one source positioned below said food position for impinging at least a portion of said radiant energy directly from said radiant energy generating means on said food and reflecting from said inner wall radiant energy not impinging directly on said food for impinging reflected radiant energy from said radiant energy generating means to said food many times from many angles; and*

*c. a support member which is transparent to said radiant energy for supporting the food at said food position while cooking.*

*28. An oven for cooking and baking food comprising:*

*a. a cooking chamber having a highly reflective and poorly absorptive inner wall for reflecting radiant energy to a food position centrally thereof;*

*b. a plurality of means for generating radiant energy having energy in the infrared range and in the visible light range of the electromagnetic spectrum and wherein the portion of energy in the visible light range is approximately seven percent, said means for generating positioned inside said cooking chamber and including at least one source positioned above and at least one source positioned below said food position for impinging at least a portion of said radiant energy directly from said radiant energy generating means on said food and reflecting from said inner wall radiant energy not impinging directly on said food for impinging reflected radiant energy from said radiant energy generating means to said food many times from many angles; and*

*c. a support member which is transparent to said radiant energy for supporting the food at said food position while cooking.*

*29. An oven for cooking and baking food comprising:*

*a. a cooking chamber having a highly reflective and poorly absorptive inner wall for reflecting radiant energy to a food position centrally thereof;*

*b. a plurality of means for generating radiant energy having energy in the infrared range and in the visible light range of the electromagnetic spectrum and wherein the portion of energy in the visible light range is approximately seven percent and higher, said means for generating positioned inside said cooking chamber and including at least one source positioned above and at least one source positioned below said food position for impinging at least a portion of said radiant energy directly from said radiant energy generating means on said food and reflecting from said inner wall radiant energy not impinging directly on said food for impinging reflected radiant energy from said radiant energy generating means to said food many times from many angles; and*

*c. a support member which is transparent to said radiant energy for supporting the food at said food position while cooking.*

*30. A method of cooking a food item having a first temperature, comprising the steps of:*

*a. generating at different positions for impingement on opposite sides of food radiant energy in the electromagnetic spectrum having wavelengths in the range of visible light and wherein said energy in the electromagnetic spectrum has a range of wavelengths from 0.4 μm to 4.5 μm with a peak intensity at approximately 1.0 μm;*

*b. directing a first portion of said energy to impinge directly on opposite sides of the food in a food position in order to bring the food to a specified second temperature, said second temperature being higher than said first temperature; and*

*c. reflecting a second portion of said energy to the food position to strike the food many times from many angles.*

*31. A method of cooking a food item having a first temperature, comprising the steps of:*

*a. generating at different positions for impingement on opposite sides of food radiant energy in the electromagnetic spectrum having wavelengths in the range of visible light and wherein the portion of energy in the range of visible light is approximately seven percent;*

*b. directing a first portion of said energy to impinge directly on opposite sides of the food in a food position in order to bring the food to a specified second temperature, said second temperature being higher than said first temperature; and*

*c. reflecting a second portion of said energy to the food position to strike the food many times from many angles.*

*32. A method of cooking a food item having a first temperature, comprising the steps of:*

*a. generating at different positions for impingement on opposite sides of food radiant energy in the electromagnetic spectrum having wavelengths in the range of visible light and wherein the portion of energy in the range of visible light is approximately seven percent and higher;*

*b. directing a first portion of said energy to impinge directly on opposite sides of the food in a food position in order to bring the food to a specified second temperature, said second temperature being higher than said first temperature; and*

*c. reflecting a second portion of said energy to the food position to strike the food many times from many angles.*

* * * * *